US005821178A

United States Patent [19]

Cohen

[11] Patent Number: 5,821,178
[45] Date of Patent: Oct. 13, 1998

[54] NONWOVEN LAMINATE BARRIER MATERIAL

[75] Inventor: Bernard Cohen, Berkeley Lake, Ga.

[73] Assignee: Kimberly-Clark Worldwide, Inc., Neenah, Wis.

[21] Appl. No.: 744,561

[22] Filed: Nov. 6, 1996

Related U.S. Application Data

[63] Continuation of Ser. No. 366,850, Dec. 30, 1994, abandoned.

[51] Int. Cl.$^6$ ..................................................... B32B 5/06
[52] U.S. Cl. ......................... 442/340; 442/346; 442/351; 442/382; 442/389; 422/903
[58] Field of Search ........................... 428/903; 442/340, 442/346, 351, 382, 389

[56] References Cited

U.S. PATENT DOCUMENTS

| Re. 30,782 | 10/1981 | van Turnhout | 264/22 |
| Re. 31,285 | 6/1983 | van Turnhout et al. | 55/155 |
| Re. 32,171 | 6/1986 | van Turnhout | 55/155 |
| 668,791 | 2/1901 | Blake et al. . | |
| 813,063 | 2/1906 | Sutton et al. . | |

(List continued on next page.)

FOREIGN PATENT DOCUMENTS

| 1188452 | 6/1985 | Canada . | |
| 0 125 851 | 11/1984 | European Pat. Off. | D21C 9/00 |
| 0 156 160 | 10/1985 | European Pat. Off. | A61L 15/00 |
| 0334829 | 9/1989 | European Pat. Off. . | |
| 0337662 | 10/1989 | European Pat. Off. . | |
| 0 375 234 | 6/1990 | European Pat. Off. . | |
| 0 391 725 | 10/1990 | European Pat. Off. . | |
| 0444671A3 | 9/1991 | European Pat. Off. . | |
| 0462574A1 | 12/1991 | European Pat. Off. . | |
| 0 478 011 | 4/1992 | European Pat. Off. | A61F 13/15 |
| 0 497 072 | 8/1992 | European Pat. Off. | A61F 13/15 |
| 0 520 798 | 12/1992 | European Pat. Off. | D04H 1/42 |
| 0 550 029 | 7/1993 | European Pat. Off. . | |
| 0 575 629 | 12/1993 | European Pat. Off. . | |
| 0 576 738 | 1/1994 | European Pat. Off. | A61F 13/15 |
| 0 594 123 | 4/1994 | European Pat. Off. | 55/524 |
| 1 084 015 | 9/1957 | Germany | 156/276 |
| 44 47 152 | 7/1995 | Germany | A61L 15/60 |
| 58-076118 | 7/1958 | Japan . | |
| 62-053719 | 8/1987 | Japan . | |
| 62-074423 | 9/1987 | Japan . | |
| 1-246413 | 10/1989 | Japan . | |
| 5-064713 | 3/1993 | Japan . | |
| 2 026 379 | 2/1980 | United Kingdom | D06M 9/00 |
| 2 242 142 | 9/1991 | United Kingdom | B03C 3/28 |
| 81/03265 | 11/1981 | WIPO . | |
| 90/11784 | 10/1990 | WIPO . | |
| 91/08254 | 6/1991 | WIPO . | |
| 92/16681 | 10/1992 | WIPO | D04H 1/42 |
| 93/06168 | 4/1993 | WIPO . | |
| 93/09156 | 5/1993 | WIPO | C08G 8/18 |
| 94/00166 | 1/1994 | WIPO . | |
| 94/01068 | 1/1994 | WIPO . | |
| WO 94/00166 | 1/1994 | WIPO . | |
| 95/05232 | 2/1995 | WIPO . | |
| 95/05501 | 2/1995 | WIPO . | |
| 95/22646 | 8/1995 | WIPO . | |
| 96/00093 | 1/1996 | WIPO . | |
| 96/28597 | 9/1996 | WIPO . | |

OTHER PUBLICATIONS

Database WPI, Section Ch, Week 8428, Derwent Publications Ltd., London, GB; Class A87, AN 84–173431, XP002008760, & JP,A,59 094 621 (Unitika KK), 31 May 1984, see abstract.

Patent Abstracts of Japan, vol. 10, No. 71 (C–334), 20 Mar. 1986 & JP,A,60 209220 (Kouken K.K.), 21 Oct. 1985, see abstract.

Patent Abstracts of Japan, vol. 6, No. 191 (C–127), 30 Sep. 1982 & JP,A,57 105217 (Nitta K.K.), 30 Jun. 1982, see abstract & Chemical Abstracts, vol. 97, No. 26, 27 Dec. 1982, Columbus, Ohio, US; abstract No. 218901, "Fibrous Filtering Material", see abstract.

Patent Abstracts of Japan, vol. 11, No. 315 (C–451), 14 Oct. 1987 & JP,A,62 102809 (Mitsui Petrochem. Ind. Ltd.), 13 May 1987, see abstract & Database WPI, Section Ch, Week 8725, Derwent Publications Ltd., London, GB; Class A12, AN 87–172842 & JP,A,62 102 809 (Mitsui Petrochem. Ind. Co. Ltd.), 13 May 1987, see abstract.

Journal of Electrostatics, vol. 21, 1988, Amsterdam NL, pp. 81–98, XP002012022, P.A. Smith & G. C. East: "Generation of Triboelectric Charge in Textile Fibre Mistures, and their use as Air Filters", see document.

An Introduction to Electrostatic Separation, Technical Bulletin, Bulletin 8570, Carpco, Inc.

Electrostatic Separation of Mixed Granular Solids by Oliver C. Ralston, Elsevier Publishing Company, 1961, Chapter IV, "Applications of Electrostatic Separation", pp. 134–234.

USSN 08/242,948 filed May 16, 1994 entitled "Nonwoven Absorbent Polymeric Fabric Exhibiting Improved Fluid Management And Methods For Making The Same".

"Bonding Process", IBM Technial Disclosure Bulletin, vol. 14, No. 12, May 1972.

Database WPI, Section Ch, Week 8930, Derwent Publications, Ltd., London, GB; Class A94, AN 89–217687 XP002005648 & JP,A,01 156 578 (Showa Denko), 20 Jun. 1989, See Abstract.

J. van Turnhout: "Topics in Applied Physics, vol. 33, Chapter 3 Thermally Stimulated Discharge of Electrets", pp. 81–215 (1980).

J. van Turnhout: Thermally Stimulated Discharge of Polymer Electrets, Chapter 1, pp. 1–24 (1975).

G.M. Sessler: "Electronic Properties of Polymers, Chapter 3 Charge Storage", pp. 59–107.

*Primary Examiner*—James J. Bell
*Attorney, Agent, or Firm*—David J. Alexander; Jones & Askew, LLP

[57] ABSTRACT

A nonwoven web laminate having improved particulate barrier properties, and particularly improved particulate barrier properties for particles in the size range of between 0.19 microns and 0.5 microns, is provided. The particulate barrier properties are improved by subjecting one or more of the layers forming the nonwoven web laminate to corona discharge. The improved particulate barrier properties are further achieved without substantially altering or increasing the amount of surface charge on the nonwoven web laminate.

10 Claims, No Drawings

U.S. PATENT DOCUMENTS

| | | |
|---|---|---|
| 859,998 | 7/1907 | Wentworth . |
| 924,032 | 6/1909 | Blake et al. . |
| 1,222,305 | 4/1917 | Kraus . |
| 1,297,159 | 3/1919 | Hedberg . |
| 1,355,477 | 10/1920 | Howell . |
| 2,106,865 | 2/1938 | Bantz et al. ............................ 209/127 |
| 2,217,444 | 10/1940 | Hill ............................................. 91/18 |
| 2,328,577 | 9/1943 | Oglesby ..................................... 117/17 |
| 2,378,067 | 3/1945 | Cook, Jr. ................................. 209/127 |
| 2,398,792 | 4/1946 | Johnson ................................. 209/127 |
| 2,748,018 | 5/1956 | Miller ........................................ 117/17 |
| 2,998,051 | 8/1961 | Sittel ........................................ 154/1.7 |
| 3,012,668 | 12/1961 | Fraas ...................................... 209/127 |
| 3,059,772 | 10/1962 | Le Baron ............................... 209/127 |
| 3,125,547 | 3/1964 | Blatz ..................................... 260/45.5 |
| 3,281,347 | 10/1966 | Winder .................................... 204/168 |
| 3,323,933 | 6/1967 | Barford et al. .......................... 117/17 |
| 3,338,992 | 8/1967 | Kinney ...................................... 264/24 |
| 3,341,007 | 9/1967 | Moyer, Jr. et al. ........................ 209/2 |
| 3,341,394 | 9/1967 | Kinney ..................................... 161/72 |
| 3,380,584 | 4/1968 | Fulwyler ..................................... 209/3 |
| 3,402,814 | 9/1968 | Morel et al. ............................ 209/127 |
| 3,436,797 | 4/1969 | Graf et al. ........................... 156/272.6 |
| 3,502,763 | 3/1970 | Hartmann ............................... 264/210 |
| 3,542,615 | 11/1970 | Dobo et al. ............................. 156/181 |
| 3,581,886 | 6/1971 | Singewald et al. ........................ 209/9 |
| 3,692,606 | 9/1972 | Miller et al. .......................... 156/273.1 |
| 3,692,618 | 9/1972 | Dorschner et al. ...................... 161/72 |
| 3,802,817 | 4/1974 | Matsuki et al. ........................... 425/66 |
| 3,821,021 | 6/1974 | McMillin ............................. 117/135.5 |
| 3,849,241 | 11/1974 | Butin et al. ............................. 161/169 |
| 3,855,046 | 12/1974 | Hansen et al. ......................... 161/150 |
| 3,859,330 | 1/1975 | Proskow ........................... 260/47 UA |
| 3,896,802 | 7/1975 | Williams ................................. 128/156 |
| 3,907,604 | 9/1975 | Prentice ................................. 136/146 |
| 3,909,009 | 9/1975 | Cvetko et al. ............................ 274/37 |
| 3,962,386 | 6/1976 | Driscoll ..................................... 264/22 |
| 3,979,529 | 9/1976 | Rebentisch et al. ...................... 427/25 |
| 3,998,916 | 12/1976 | van Turnhout ........................... 264/22 |
| 4,011,067 | 3/1977 | Carey, Jr. .................................. 55/354 |
| 4,013,816 | 3/1977 | Sabee et al. ............................ 428/288 |
| 4,035,164 | 7/1977 | Taylor . |
| 4,041,203 | 8/1977 | Brock et al. ............................ 428/157 |
| 4,058,724 | 11/1977 | McKinney et al. . |
| 4,070,218 | 1/1978 | Weber .................................... 156/167 |
| 4,091,140 | 5/1978 | Harrnon . |
| 4,096,289 | 6/1978 | Nischwitz et al. ........................ 427/32 |
| 4,103,062 | 7/1978 | Aberson et al. ........................ 428/283 |
| 4,140,607 | 2/1979 | Kreiseimeier et al. ................. 204/168 |
| 4,170,304 | 10/1979 | Huke . |
| 4,178,157 | 12/1979 | van Turnhout et al. .................. 55/155 |
| 4,185,972 | 1/1980 | Nitta et al. . |
| 4,196,245 | 4/1980 | Kitson et al. ........................... 428/198 |
| 4,208,366 | 6/1980 | Kinney . |
| 4,209,563 | 6/1980 | Sisson ................................... 428/288 |
| 4,215,682 | 8/1980 | Kubik et al. ........................ 128/205.29 |
| 4,223,677 | 9/1980 | Anderson ................................ 128/287 |
| 4,273,635 | 6/1981 | Beraud et al. .......................... 204/165 |
| 4,298,440 | 11/1981 | Hood ..................................... 204/165 |
| 4,305,797 | 12/1981 | Knoll et al. ........................ 204/180 R |
| 4,307,143 | 12/1981 | Meitner ..................................... 252/91 |
| 4,308,223 | 12/1981 | Stern ...................................... 264/22 |
| 4,310,478 | 1/1982 | Balslev et al. . |
| 4,323,374 | 4/1982 | Shinagawa et al. . |
| 4,324,198 | 4/1982 | Muz ....................................... 118/630 |
| 4,340,563 | 7/1982 | Appel et al. ............................ 264/518 |
| 4,342,812 | 8/1982 | Selwood ................................ 428/286 |
| 4,353,799 | 10/1982 | Leonard ............................... 210/321.3 |
| 4,357,234 | 11/1982 | Inculet et al. ...................... 209/127 B |
| 4,363,682 | 12/1982 | Thiebault . |
| 4,363,723 | 12/1982 | Knoll et al. ............................. 209/128 |
| 4,373,224 | 2/1983 | Bandai et al. . |
| 4,374,727 | 2/1983 | Takahashi et al. .................. 209/127 B |
| 4,374,888 | 2/1983 | Bornslaeger ........................... 428/198 |
| 4,375,718 | 3/1983 | Wadsworth et al. ..................... 29/592 |
| 4,392,876 | 7/1983 | Schmidt . |
| 4,394,235 | 7/1983 | Brandt et al. . |
| 4,411,795 | 10/1983 | Olson ..................................... 210/679 |
| 4,430,277 | 2/1984 | Lin . |
| 4,443,513 | 4/1984 | Meitner et al. ......................... 422/195 |
| 4,443,515 | 4/1984 | Atlas ...................................... 428/224 |
| 4,451,589 | 5/1984 | Morman et al. ........................ 523/124 |
| 4,455,195 | 6/1984 | Kinsley ..................................... 162/13 |
| 4,455,237 | 6/1984 | Kinsely ................................... 210/767 |
| 4,456,648 | 6/1984 | Adamse et al. ........................ 428/283 |
| 4,492,633 | 1/1985 | Sandulyak et al. . |
| 4,507,539 | 3/1985 | Sando et al. ..................... 219/121 PY |
| 4,513,049 | 4/1985 | Yamasaki et al. . |
| 4,514,289 | 4/1985 | Inculet ................................. 209/127.3 |
| 4,517,143 | 5/1985 | Kisler . |
| 4,534,918 | 8/1985 | Forrest, Jr. . |
| 4,547,420 | 10/1985 | Krueger et al. ........................ 428/229 |
| 4,551,378 | 11/1985 | Carey, Jr. ............................... 428/198 |
| 4,554,207 | 11/1985 | Lee ....................................... 428/288 |
| 4,555,811 | 12/1985 | Shimalla ..................................... 2/51 |
| 4,588,537 | 5/1986 | Klaase et al. ............................ 264/22 |
| 4,592,815 | 6/1986 | Nakao .................................... 204/165 |
| 4,594,626 | 6/1986 | Frangesh . |
| 4,618,524 | 10/1986 | Groitzsch et al. ...................... 428/198 |
| 4,622,259 | 11/1986 | McAmish et al. ...................... 428/171 |
| 4,623,438 | 11/1986 | Felton et al. ........................... 204/168 |
| 4,626,263 | 12/1986 | Inoue et al. . |
| 4,652,282 | 3/1987 | Ohmori et al. ........................... 55/155 |
| 4,652,322 | 3/1987 | Lim ....................................... 156/181 |
| 4,657,639 | 4/1987 | Mahadevan et al. . |
| 4,657,804 | 4/1987 | Mays et al. ............................ 428/212 |
| 4,663,220 | 5/1987 | Wisneski et al. ....................... 428/221 |
| 4,670,913 | 6/1987 | Morell et al. ............................. 2/227 |
| 4,671,943 | 6/1987 | Wahlquist . |
| 4,677,017 | 6/1987 | DeAntonis et al. .................... 428/214 |
| 4,689,241 | 8/1987 | Richart et al. ............................ 427/28 |
| 4,699,823 | 10/1987 | Kellenberger et al. ................. 428/219 |
| 4,705,151 | 11/1987 | Eldridge . |
| 4,707,398 | 11/1987 | Boggs .................................... 428/224 |
| 4,720,415 | 1/1988 | Vander Wielen et al. .............. 428/152 |
| 4,729,371 | 3/1988 | Krueger et al. .................... 128/206.19 |
| 4,738,772 | 4/1988 | Giesfeldt .................................... 209/2 |
| 4,739,882 | 4/1988 | Parikh et al. . |
| 4,749,348 | 6/1988 | Klaase et al. ........................ 425/174.8 |
| 4,761,326 | 8/1988 | Barnes et al. .......................... 428/219 |
| 4,789,504 | 12/1988 | Ohmori et al. . |
| 4,795,668 | 1/1989 | Krueger et al. ........................ 428/174 |
| 4,797,201 | 1/1989 | Kuppers et al. ..................... 209/127.4 |
| 4,797,318 | 1/1989 | Brooker et al. . |
| 4,818,464 | 4/1989 | Lau ........................................ 264/510 |
| 4,826,703 | 5/1989 | Kisler ..................................... 427/466 |
| 4,831,664 | 5/1989 | Suda . |
| 4,847,914 | 7/1989 | Suda . |
| 4,859,266 | 8/1989 | Akasaki et al. ...................... 156/273.1 |
| 4,863,785 | 9/1989 | Berman et al. ........................ 428/218 |
| 4,863,983 | 9/1989 | Johnson et al. ......................... 524/140 |
| 4,874,399 | 10/1989 | Reed et al. ................................. 55/2 |
| 4,874,659 | 10/1989 | Ando et al. ............................ 428/221 |
| 4,883,052 | 11/1989 | Weiss et al. . |
| 4,886,527 | 12/1989 | Fottinger et al. ........................ 55/156 |
| 4,894,131 | 1/1990 | Jacobs et al. .......................... 204/165 |
| 4,901,370 | 2/1990 | Suda . |
| 4,904,174 | 2/1990 | Moosmayer et al. . |
| 4,917,942 | 4/1990 | Winters ................................. 428/286 |
| 4,920,168 | 4/1990 | Nohr et al. ............................. 524/188 |
| 4,944,854 | 7/1990 | Felton et al. ........................... 204/168 |
| 4,948,515 | 8/1990 | Okumura et al. ...................... 210/748 |

| | | | | | | | |
|---|---|---|---|---|---|---|---|
| 4,948,639 | 8/1990 | Brooker et al. | 428/35.2 | 5,244,482 | 9/1993 | Hassenboehler, Jr. | 55/528 |
| 4,960,820 | 10/1990 | Hwo | 524/528 | 5,246,637 | 9/1993 | Matsuura et al. . | |
| 4,965,122 | 10/1990 | Morman | 428/225 | 5,247,072 | 9/1993 | Ning et al. | 536/97 |
| 4,983,677 | 1/1991 | Johnson et al. | 525/127 | 5,254,297 | 10/1993 | Deeds . | |
| 5,012,094 | 4/1991 | Hamade . | | 5,256,176 | 10/1993 | Matsuura et al. | 55/528 |
| 5,021,501 | 6/1991 | Ohmori et al. | 524/544 | 5,257,982 | 11/1993 | Cohen et al. | 604/378 |
| 5,032,419 | 7/1991 | Lamirand et al. | 427/470 | 5,264,276 | 11/1993 | McGregor et al. | 428/252 |
| 5,035,941 | 7/1991 | Blackburn | 428/286 | 5,284,703 | 2/1994 | Everhart et al. | 428/283 |
| 5,051,159 | 9/1991 | Togashi et al. | 204/165 | 5,286,326 | 2/1994 | Greve | 156/272.4 |
| 5,055,151 | 10/1991 | Duffy . | | 5,294,482 | 3/1994 | Gessner . | |
| 5,057,710 | 10/1991 | Nishiura et al. | 307/400 | 5,306,534 | 4/1994 | Bosses | 428/35.2 |
| 5,062,158 | 11/1991 | Oka | 2/46 | 5,308,674 | 5/1994 | Zafiroglu | 428/102 |
| 5,077,468 | 12/1991 | Hamade . | | 5,308,691 | 5/1994 | Lim et al. | 428/286 |
| 5,090,975 | 2/1992 | Requejo et al. . | | 5,336,545 | 8/1994 | Morman | 428/152 |
| 5,110,620 | 5/1992 | Tani et al. | 427/40 | 5,350,620 | 9/1994 | Sundet et al. | 428/172 |
| 5,112,048 | 5/1992 | Deeds . | | 5,389,202 | 2/1995 | Everhart et al. | 162/103 |
| 5,112,677 | 5/1992 | Tani et al. . | | 5,397,413 | 3/1995 | Trimble et al. | 156/167 |
| 5,118,942 | 6/1992 | Hamade | 250/324 | 5,401,446 | 3/1995 | Tsai et al. | 264/22 |
| 5,135,724 | 8/1992 | Dinter et al. . | | 5,407,581 | 4/1995 | Onodera et al. | 210/654 |
| 5,138,971 | 8/1992 | Nakajima et al. . | | 5,409,766 | 4/1995 | Yuasa et al. | 428/224 |
| 5,143,767 | 9/1992 | Matsuura et al. . | | 5,411,576 | 5/1995 | Jones et al. | 95/57 |
| 5,149,335 | 9/1992 | Kellenberger et al. | 604/372 | 5,436,033 | 7/1995 | Mino et al. . | |
| 5,156,902 | 10/1992 | Pieper et al. | 604/370 | 5,436,066 | 7/1995 | Chen | 428/288 |
| 5,165,979 | 11/1992 | Watkins et al. | 428/113 | 5,441,550 | 8/1995 | Hassenboehler, Jr. | 55/486 |
| 5,169,706 | 12/1992 | Collier, IV et al. | 428/152 | 5,443,606 | 8/1995 | Hassenboehler, Jr. | 55/486 |
| 5,173,356 | 12/1992 | Eaton et al. | 428/219 | 5,455,108 | 10/1995 | Quincy et al. | 428/266 |
| 5,178,932 | 1/1993 | Perkins et al. | 428/198 | 5,456,972 | 10/1995 | Roth et al. | 428/224 |
| 5,183,701 | 2/1993 | Jacobs et al. | 428/229 | 5,464,688 | 11/1995 | Timmons et al. . | |
| 5,188,885 | 2/1993 | Timmons et al. | 428/198 | 5,468,428 | 11/1995 | Hanschen et al. . | |
| 5,204,174 | 4/1993 | Daponte et al. | 428/286 | 5,472,481 | 12/1995 | Jones et al. | 96/15 |
| 5,206,061 | 4/1993 | Ando et al. | 428/34.7 | 5,482,765 | 1/1996 | Bradley et al. . | |
| 5,213,881 | 5/1993 | Timmons et al. | 428/224 | 5,486,411 | 1/1996 | Hassenboehler, Jr. | 428/286 |
| 5,213,882 | 5/1993 | Sassa et al. | 428/224 | 5,491,022 | 2/1996 | Smith | 428/224 |
| 5,226,992 | 7/1993 | Morman | 156/62.4 | 5,493,117 | 2/1996 | Tamaki et al. | 264/483 |
| 5,230,727 | 7/1993 | Pound et al. | 55/492 | 5,496,507 | 3/1996 | Angadjivand et al. | 264/423 |
| 5,232,770 | 8/1993 | Joseph | 428/284 | 5,503,745 | 4/1996 | Ogata et al. | 210/490 |
| 5,238,733 | 8/1993 | Joseph et al. | 428/284 | | | | |

NONWOVEN LAMINATE BARRIER MATERIAL

This application is a continuation of application Ser. No. 08/366,850 entitled "IMPROVED NONWOVEN LAMINATE BARRIER MATERIAL" and filed in the U.S. Patent and Trademark Office on Dec. 30, 1994, now abandoned. The entirety of this Application is hereby incorporated by reference.

FIELD OF THE INVENTION

The present invention relates to protective garments. More particularly, the present invention relates to protective garments formed from nonwoven fabrics having improved particulate barrier properties.

BACKGROUND OF THE INVENTION

There are many types of limited use or disposable protective garments designed to provide barrier properties. One type of protective garment is disposable protective coveralls, such as for example the coverall described in U.S. Pat. No. 4,670,913 incorporated herein by reference. Coveralls can be used to effectively seal off a wearer from a harmful environment in ways that open or cloak style protective garments such as, for example, drapes, gowns and the like are unable to do. Accordingly, coveralls have many applications where isolation of a wearer is desirable.

Protective garments should be resistant to liquids. For a variety of reasons, it is undesirable for liquids and/or pathogens which may be carried by liquids to pass through garment to contact persons working in an environment where pathogens are present.

Similarly, it is highly desirable to isolate persons from harmful substances which may be present in a work place or accident site. To increase the likelihood that the protective garment is correctly worn thereby reducing the chance of exposure, workers would benefit from wearing a protective garment that is relatively impervious to liquids and/or articles and durable but which is still comfortable so it does not reduce the workers' performance. After use, it is usually quite costly to decontaminate a protective garment that has been exposed to a harmful or hazardous substance. Thus, it is important that a protective garment be inexpensive so as to be disposable.

Generally speaking, it is desirable that disposable protective garments be made from fabrics that are relatively impervious to liquids and/or particulates. These barrier-type fabrics must also be suited for the manufacture of protective apparel at such low cost that make the discard the garments after only a single use economical.

One such disposable protective garment which is generally manufactured from nonwoven web laminates in order to assure that they are cost effectively disposable are coveralls sold under the mark Kleenguard® by Kimberly-Clark Corporation. These coveralls are manufactured from a three layer nonwoven web laminate. The two outer layers are formed from spunbond polypropylene fibers and the inner layer is formed from meltblown microfine polypropylene fibers. The outer layers of spunbond provide tough, durable and abrasion resistant surfaces. The inner layer is not only water repellent but acts as a breathable filter barrier allowing air and moisture vapor to pass through the bulk of the fabric while filtering out many harmful particles.

In some instances, material forming protective garments may include a film layer or a film laminate. While forming protective garments from a film may improved particle penetration through the bulk of the protective garment, such film or film-laminated materials may also prevent the passage of air and moisture vapor therethrough. Generally, protective garments formed from materials which do not allow sufficient passage of air and moisture vapor therethrough become uncomfortable to wear correctly for extended periods of time.

Thus, while in some instances, film or film-laminated materials may provide improved particulate barrier properties as compared to nonwoven-laminated fabrics, nonwoven-laminated fabrics provide greater wearer comfort. Therefore, a need exists for an inexpensive disposable protective garment, and more particularly an inexpensive disposable protective garment formed from a nonwoven fabric, which provides improved particulate barrier properties while also being breathable and thus comfortable to wear correctly for extended periods of time.

SUMMARY OF THE INVENTION

In response to the above need for a nonwoven fabric having improved particulate barrier properties, the present invention provides a nonwoven web laminate which is suitable for forming a protective garment such as a coverall. In one embodiment, the nonwoven web laminate includes a layer formed from spunbond fibers and a layer formed from meltblown fibers wherein at least one of the layers is subjected to corona discharge. In another embodiment, the layer formed from meltblown fibers is subjected to corona discharge.

In still another embodiment, the nonwoven web laminate of the present invention includes two layers formed from spunbond fibers. The two layers formed from spunbond fibers are separated by a layer formed form meltblown fibers. The nonwoven web laminate of this embodiment may be subjected to corona discharge or individual layers, such as the layer formed form meltblown fibers may be subjected to corona discharge.

These embodiments illustrate improved particulate filtration efficiencies as compared to similarly formed nonwoven web laminates which have not been subjected to corona discharge. More particularly, the percent improvement in particulate filtration efficiency for the corona discharge-treated nonwoven web laminates for particles in the range of from between 0.19 microns to 0.3 microns, as compared to the non-corona discharge-treated nonwoven web laminates is at least about 85. The percent improvement in particulate filtration efficiency for the corona discharged-treated nonwoven web laminates for particles in the range of from between 0.3 microns to 0.5 microns, as compared to the non-corona discharge-treated nonwoven web laminates, is at least about 29.

Furthermore, the above described improvements in particulate filtration efficiencies are achieved without the necessity of forming a substantially higher charge on the surface or surfaces of the nonwoven web laminates than was present prior to corona discharge treatment.

DETAILED DESCRIPTION OF THE INVENTION

As used herein, the term "nonwoven web" refers to a web that has a structure of individual fibers or filaments which are interlaid, but not in an identifiable repeating manner.

As used herein the term "spunbond fibers" refers to small diameter fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. Nos. 3,502,763 and 3,909,009 to Levy, and U.S. Pat. No. 3,542,615 to Dobo et al which are all herein incorporated by reference. Spunbond fibers are generally continuous and larger than 7 microns, more particularly, having an average diameter of greater than 10 microns.

As used herein the term "meltblown fibers" means fibers formed by extruding a molten thermoplastic material through a plurality of fine, usually circular, die capillaries as molten threads or filaments into a high velocity, usually heated gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Meltblowing is well known in the art and is described, for example, in U.S. Pat. No. 3,849,241 to Buntin, U.S. Pat. No. 4,307,143 to Meitner et al., and U.S. Pat. No. 4,707,398 to Wisneski et al which are all herein incorporated by reference. Meltblown fibers are microfibers which are generally smaller than 10 microns in diameter.

As used herein, the term "micro fine fibers" or "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, for example, U.S. Pat. No. 5,213,881, entitled "A Nonwoven Web With Improved Barrier Properties", incorporated herein by reference in its entirety.

Polymers are well suited for the formation of nonwoven webs which are useful in the practice of the present invention. Nonwoven webs can be made from a variety of processes including, but not limited to, air laying processes, wet laid processes, hydroentangling processes, spunbonding, meltblowing, staple fiber carding and bonding, and solution spinning. The fibers forming these nonwoven webs can be made from a variety of dielectric materials including, but not limited to, polyesters, polyolefins, nylon and copolymer of these materials. The fibers may be relatively short, staple length fibers, typically less than 3 inches, or longer more continuous fibers such as are produced by a spunbonding process.

It has been found that nonwoven webs formed from thermoplastic based fibers and particularly polyolefin-based fibers are particularly well-suited for the above applications. Examples of such fibers include spunbond fibers and meltblown fibers. Examples of such nonwoven webs formed from such fibers are the polypropylene nonwoven webs produced by the Assignee of record, Kimberly-Clark Corporation.

The present invention includes a multilayer nonwoven web laminate. In one embodiment, the multilayer nonwoven web laminate includes at least one layer formed from spunbond fibers and another layer formed from meltblown fibers, such as a spunbond/meltblown (SM) nonwoven web laminate. In another embodiment, the multilayer nonwoven web laminate includes at least one layer formed from meltblown fibers separating two layers formed from spunbond fibers, such as a spunbond/meltblown/spunbond (SMS) nonwoven web laminate. Examples of these nonwoven web laminates are disclosed in U.S. Pat. No. 4,041,203 to Brock et al., U.S. Pat. No. 5,169,706 to Collier, et al, and U.S. Pat. No. 4,374,888 to Bornslaeger which are all herein incorporated by reference. The SMS nonwoven web laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 0.1 to 12 ounces per square yard (osy) (3 to 400 grams per square meter (gsm)), or more particularly from about 0.75 to about 3 osy (25 to 100 gsm).

Multilayer nonwoven web laminates may be generally bonded in some manner as they are produced in order to give them sufficient structural integrity to withstand the rigors of further processing into a finished product. Bonding can be accomplished in a number of ways such as hydroentanglement, needling, ultrasonic bonding, adhesive bonding and thermal bonding.

Ultrasonic bonding is performed, for example, by passing the multilayer nonwoven web laminate between a sonic horn and anvil roll as illustrated in U.S. Pat. No. 4,374,888 to Bornslaeger.

Thermal bonding of a multilayer nonwoven web laminate may be accomplished by passing the same between the rolls of a calendering machine. At least one of the rollers of the calender is heated and at least one of the rollers, not necessarily the same one as the heated one, has a pattern which is imprinted upon the laminate as it passes between the rollers. As the fabric passes between the rollers it is subjected to pressure as well as heat. The combination of heat and pressure applied in a particular pattern results in the creation of fused bond areas in the multilayer nonwoven web laminate where the bonds thereon correspond to the pattern of bond points on the calender roll.

Various patterns for calender rolls have been developed. One example is the Hansen-Pennings pattern with between about 10 to 25% bond area with about 100 to 500 bonds/square inch as taught in U.S. Pat. No. 3,855,046 to Hansen and Pennings. Another common pattern is a diamond pattern with repeating and slightly offset diamonds.

The exact calender temperature and pressure for bonding the multilayer nonwoven web laminate depend on thermoplastic(s) from which the nonwoven web is made. Generally for multilayer nonwoven web laminates formed from polyolefins, the preferred temperatures are between 150° and 350° F. (66° and 177° C.) and the pressure between 300 and 1000 pounds per lineal inch. More particularly, for polypropylene, the preferred temperatures are between 270° and 320° F. (132° and 160° C.) and the pressure between 400 and 800 pounds per lineal inch.

Methods of subjecting nonwoven webs to corona discharge, are well known by those skilled in the art. Briefly, corona discharge is achieved by the application of sufficient voltage to an electric field initiating structure (EFIS) in the proximity of an electric field receiving structure (EFRS). The voltage should be sufficiently high such that ions are generated at the EFIS and flow from the EFIS to the EFRS.

Both the EFIS and the EFRS are desirable formed from conductive materials. Suitable conductive materials include copper, tungsten, stainless steel and aluminum.

One particular technique of subjecting nonwoven webs to corona discharge is the technique disclosed in U.S. patent application Ser. No. 07/958,958 filed Oct. 9, 1992 which is assigned to the University of Tennessee, and is herein incorporated in its entirety by reference. This technique involves subjecting the nonwoven web to a pair of electrical fields wherein the electrical fields have opposite polarities. Each electrical field forms a corona discharge.

In those instances where the nonwoven web includes multiple layers, the entire thickness of the nonwoven web may be subjected to corona discharge. In other instances, one or more of the individual layers which form the nonwoven web laminate or the fibers forming such individual layers may be separately subjected corona discharge and then combined with other layers in a juxtaposed relationship to form the nonwoven web laminate. In some instances, as will be illustrated in the following EXAMPLES, the electric charge on the nonwoven web laminate prior to subjecting the web to corona discharge was substantially the same as the post corona discharge treated web. In other words, the nonwoven web laminate did not generally exhibit a higher electric charge after subjecting the web to corona discharge than the electric charge present on the web before subjecting it to corona discharge.

To demonstrate the attributes of the present invention, a SMS polypropylene nonwoven web laminate and a layer formed from polypropylene meltblown fibers were subjected to corona discharge, as described in greater detail below. Among the analyses conducted on these nonwoven webs, both pre and post corona discharge, were two particulate filtration tests. One of the particulate filtration tests is generally known as the NaCl Filter Efficiency Test (hereinafter the "NaCl Test"). The NaCl Test was conducted on an automated filter tester, Certitest™ Model #8110, which is available from TSI Inc., St. Paul, Minn. The particulate filtration efficiency of the test fabric is defined in percentage as 100×(1-(downstream particles/upstream particles)). The upstream particles represent the total quantity of particles which are introduced into the tester. The downstream particles are those particles which have been introduced into the tester and which have passed through the bulk of the test fabric. The tester determines the efficiency of a filter medium with an air flow that is supplied, which in this case was about 32 liters per minute. The air flow contains a known quantity of approximately 0.1 $\mu$m NaCl aerosol particles which are dispersed therein. At about 32 liters per minute of air flow, the pressure drop of between 4 and 5 mm Water Gage develops between the atmosphere on the upstream side of the test fabric and that on the down stream side of the test fabric.

The other particulate filtration test is generally known as the "BTTG Test". "BTTG" stands for British Textile Technology Group, located in Manchester, England. In general, the BTTG Test involves the dispersing of particulate material, such as talcum powder, into the air on the "challenge" side of the test fabric by means of a fan. The fan not only directs the particle containing air onto the face of the test fabric but may be adjusted to cause a selected pressure drop (i.e. 5 mm Water Gage) to develop between the atmosphere on the challenge side of the test fabric and that on the reverse side of the test fabric. The concentration of dust particles in the "challenge" atmosphere and the concentration of dust particles in the atmosphere on the reverse side of the test fabric (i.e. the particles that have passed through the test fabric) are measured in various size ranges by means of a particle counter. The filtration efficiency of the test fabric for a given particle size range is defined in percentage as 100 ×(1-(challenge side particles sizes/reverse side particles sizes)). The challenge side particles represents the total quantity of particles of various sizes introduced into the air on the challenge side of the test fabric. The reverse side particles represents the quantity of challenge side particles of various sizes which pass through the bulk of the test fabric.

EXAMPLE I

In EXAMPLE I, a quantity of 1.8 osy polypropylene SMS nonwoven web laminate was produced. The spunbond layers were formed from polypropylene resins Exxon PD-3445 and Himont PF-301. White and dark blue pigments, Ampacet 41438 (Ampacet Inc., N.Y.) and SCC 4402 (Standrige Color Inc., Ga.), respectively, were added to the polypropylene resins forming one of the spunbond layers. The other spunbond layer was formed from these polypropylene resins without pigments. The meltblown layer was formed from the polypropylene resin Himont PF-015 without pigments.

The meltblown layer had an average basis weight of about 0.45 osy and each spunbond layer had an average basis weight of about 0.675 osy. A quantity of this 1.8 osy SMS was subjected to corona discharge (SMS-CD). The corona discharge was produced by using a Model No. P/N 25A—120 volt, 50/60 Hz reversible polarity power unit (Simco Corp., Hatfield, Pa.), which was connected to the EFIS, and a Model No. P16V 120 V, 0.25A 50/60 Hz power unit (Simco Corp., Hatfield, Pa.) which was connected to the EFRS. The EFIS was a RC-3 Charge Master charge bar (Simco. Corp.) and the EFRS was a solid, three inch diameter, aluminum roller. The corona discharge environment was 70° F. and 40% relative humidity. As described in the above University of Tennessee Patent Application, two sets of EFIS/EFRS are used. The voltage applied to the first set of EFIS/EFRS was 15 KV/0.0 V, respectively. The voltage applied to the second set of EFIS/EFRS was 25 KV/7.5 KV, respectively. The gap between the EFIS and the EFRS for each set was one inch.

The particulate filtration efficiency using the BTTG Test was determined for a portion of both the 1.8 osy SMS nonwoven web laminate subjected to corona discharge (SMS-CD) and the 1.8 osy SMS nonwoven web laminate which was not subjected to corona discharge (SMS). The results are reported in Table I.

TABLE I

| | Particulate Filtration Efficiency (%) Particle Sizes (Microns) | | | | |
|---|---|---|---|---|---|
| Fabric | .19–.3 | .3–.5 | .5–1 | 1–3 | 3–5 |
| SMS-CD | 76.5 | 89.4 | 96.4 | 98.2 | 97.6 |
| SMS | 41.3 | 68.1 | 84.4 | 92.1 | 94.8 |

EXAMPLE II

In EXAMPLE II, a quantity of 1.8 osy polypropylene SMS nonwoven web laminate was produced. The meltblown and spunbond average basis weights in this SMS sample were the same in EXAMPLE II as they were in EXAMPLE I. However, in preparing one portion of the SMS nonwoven web, the meltblown layer was subjected to corona discharge and then bonded to the spunbond layers. The corona discharge was produced under essentially the same conditions and using essentially the same equipment and equipment setup as described in EXAMPLE I.

The particulate filtration efficiency using the BTTG Test was determined for a portion of both the 1.8 osy SMS nonwoven web laminate formed from the meltblown layer which was subjected to corona discharge (SMS-MCD) and the 1.8 osy SMS nonwoven web laminate which was not subjected to corona discharge (SMS). The results are reported in Table II.

TABLE II

| Fabric | Particulate Filtration Efficiency (%) Particle Sizes (Microns) | | | | |
|---|---|---|---|---|---|
| | .19–.3 | .3–.5 | .5–1 | 1–3 | 3–5 |
| SMS-CD | 58.5 | 84.9 | 94.1 | 97.5 | 98.3 |
| SMS | 21.7 | 65.6 | 83.9 | 94.2 | 96.9 |

The data from both EXAMPLE I and II illustrate improved particulate filtration efficiency, and particularly improved particulate filtration efficiency of particles in the size range of between 0.19 microns to 0.5 microns, as a result of subjection either the entire nonwoven web laminate or one of the layers which form the nonwoven web laminate to corona discharge.

Concerning EXAMPLE I, the percent improvement in particulate filtration efficiency for the corona discharge-treated SMS (SMS-CD) for particles in the range of from between 0.19 microns to 0.3 microns, as compared to the non-corona discharge-treated SMS (SMS), was about 85.2. The percent improvement in particulate filtration efficiency for the SMS-CD for particles in the range of from between 0.3 microns to 0.5 microns, as compared to the SMS, was about 31.3.

For EXAMPLE II, the percent improvement in particulate filtration efficiency for the SMS fabric formed from the corona discharged treated meltblown (SMS-MCD) for particles in the range of from between 0.19 microns to 0.3 microns, as compared to the non-corona discharge-treated SMS (SMS), was about 169.6. The percent improvement in particulate filtration efficiency for the SMS-MCD for particles in the range of from between 0.3 microns to 0.5 microns, as compared to the SMS, was about 29.4.

EXAMPLE III

In EXAMPLE III, three separate 1.8 osy polypropylene SMS nonwoven web laminates were produced, wherein each SMS sample was formed from meltblown and spunbond layers having the same average basis weight as the SMS sample of EXAMPLE I.

The particulate filtration efficiency using the NaCl Test for a portion of each of the SMS samples in EXAMPLE III was determined. The surface charge of one of SMS sample (SMS) which was not subjected to corona discharge was measured. The surface charge of another SMS sample which was subjected to corona discharge (SMS-CD) was measured after being subjected to corona discharge. And the remaining SMS sample was formed by first subjecting the meltblown layer to corona discharge and then bonded to the spunbond layers (SMS-MCD). The surface voltage for each side of the formed SMS sample was measured, using an Electrostatic Voltmeter (Trek Model 344, Trek, Inc, Median, N.Y.), by taking the average of at least ten readings on each side of the samples.

The corona discharge for the SMS-CD and the SMS-MCD samples was produced under essentially the same conditions and using essentially the same equipment and equipment setup as described in EXAMPLE I. The results are reported in Table III.

TABLE III

| Fabric | Corona Discharge | Side A/B (Volt) | Filt. Efficiency (%) |
|---|---|---|---|
| SMS | NO | −123/+63 | 33.6 |
| SMS-MCD | YES | +85/−14 | 71.4 |
| SMS-CD | YES | +38/+80 | 88.2 |

EXAMPLE III illustrates that improved particulate filtration is achieved by subjecting the SMS fabric to corona discharge without the necessity of forming a substantially higher charge on the surface(s) thereof than was present prior to corona discharge treatment. In fact, the difference between the surface charge of the SMS fabric before and after corona discharge treatment is minimal at best.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto.

What is claimed is:

1. A multilayer nonwoven web laminate comprising:
   at least two layers formed from spunbond fibers and at least one layer formed from meltblown fibers wherein the layer formed from meltblown fibers separates the two layers formed from spunbond fibers, wherein the fibers of all the layers are subjected to corona discharge; and
   wherein the multilayer nonwoven web laminate has a particulate filtration efficiency percent improvement, for particles having a size range from 0.19 microns to 0.3 microns, of at least about 75% over a similar formed multilayer nonwoven web laminate which has not been subjected to corona discharge.

2. The nonwoven web laminate of claim 1, wherein the spunbond fibers and meltblown fibers are formed from polypropylene.

3. The nonwoven web laminate of claim 1, wherein the average basis weight of the nonwoven web laminate is about 1.8 ounces per square yard.

4. The nonwoven web laminate of claim 1, wherein the average basis weight of the layer formed from the meltblown fibers weighs about 0.45 ounces per square yard.

5. The nonwoven web laminate of claim 1, wherein the multilayer nonwoven web laminate has a particulate filtration efficiency percent improvement, for particles having a size range from 0.19 microns to 0.3 microns, of at least about 85% over a similar formed multilayer nonwoven web laminate which has not be subjected to corona discharge.

6. A multilayer nonwoven web laminate comprising:
   at least two layers formed from spunbond fibers and at least one layer formed from meltblown fibers wherein the layer formed from meltblown fibers separates the two layers formed from spunbond fibers, wherein the fibers of the meltblown layer are subjected to corona discharge; and
   wherein the multilayer nonwoven web laminate has a particulate filtration efficiency percent improvement, for particles having a size range from 0.19 microns to 0.3 microns, of at least about 100% over a similar formed multilayer nonwoven web laminate which has not been subjected to corona discharge.

7. The nonwoven web laminate of claim 6, wherein the spunbond fibers and meltblown fibers are formed from polypropylene.

8. The nonwoven web laminate of claim 6, wherein the average basis weight of the nonwoven web laminate is about 1.8 ounces per square yard.

9. The nonwoven web laminate of claim 6, wherein the average basis weight of the layer formed from the meltblown fibers weighs about 0.45 ounces per square yard.

10. The nonwoven web laminate of claim 6, wherein the multilayer nonwoven web laminate has a particulate filtration efficiency percent improvement, for particles having a size range from 0.19 microns to 0.3 microns, of at least about 150% over a similar formed multilayer nonwoven web laminate which has not be subjected to corona discharge.

* * * * *

UNITED STATES PATENT AND TRADEMARK OFFICE
CERTIFICATION OF CORRECTION

PATENT NO. : 5,821,178

DATED : October 13, 1998

INVENTOR(S): Bernard Cohen

It is certified that error appears in the above-identified patent and that said Letters Patent is hereby corrected as shown below:

Column 7, line 18, "SMS-CD" should read --SMS-MCD--.

Signed and Sealed this

Twenty-eighth Day of March, 2000

Attest:

Attesting Officer

Q. TODD DICKINSON

Commissioner of Patents and Trademarks